(12) United States Patent
Chen et al.

(10) Patent No.: US 8,987,958 B2
(45) Date of Patent: Mar. 24, 2015

(54) WATERPROOF MOTOR STATOR STRUCTURE

(71) Applicant: Asia Vital Components Co., Ltd., Sinjhuang District, New Taipei (TW)

(72) Inventors: Wei-Cheng Chen, New Taipei (TW); Ping-Chi Kuo, New Taipei (TW); Chu-Hsien Chou, New Taipei (TW); Shih-Chieh Lin, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 175 days.

(21) Appl. No.: 13/723,108

(22) Filed: Dec. 20, 2012

(65) Prior Publication Data

US 2014/0175923 A1   Jun. 26, 2014

(51) Int. Cl.
*H02K 5/02* (2006.01)
*H02K 5/10* (2006.01)
*H02K 1/18* (2006.01)
*H02K 5/16* (2006.01)

(52) U.S. Cl.
CPC .................. *H02K 5/10* (2013.01); *H02K 1/185* (2013.01); *H02K 5/161* (2013.01)
USPC .............................................. 310/88; 310/43

(58) Field of Classification Search
USPC ................................................ 310/88, 43, 45
See application file for complete search history.

(56) References Cited

U.S. PATENT DOCUMENTS

| | | | |
|---|---|---|---|
| 5,610,462 A * | 3/1997 | Takahashi | 310/90 |
| 6,175,171 B1 * | 1/2001 | Rupp et al. | 310/52 |
| 7,635,934 B2 * | 12/2009 | Zhu et al. | 310/88 |
| 8,506,264 B2 * | 8/2013 | Horng et al. | 417/410.1 |
| 2008/0042499 A1 * | 2/2008 | Okada | 310/43 |

* cited by examiner

*Primary Examiner* — Dang Le

(57) ABSTRACT

A waterproof motor stator structure includes a circuit board; a stator mounted on one face of the circuit board; a lower shell forming an open-topped annular recess for receiving the circuit board therein and having an central opening communicable with the annular recess; an upper shell fitted around an outer side of the stator; and a protective layer formed in the annular recess of the lower shell to encapsulate the circuit board and an open lower end of the upper shell, so that the lower shell and the upper shell are joined into an integral unit. With these arrangements, the stator located in between the lower and upper shells can be effectively protected against external moisture and salt spray with reduced time, labor and material costs while enabling extended service life a fan using same.

4 Claims, 8 Drawing Sheets

US 8,987,958 B2

WATERPROOF MOTOR STATOR STRUCTURE

FIELD OF THE INVENTION

The present invention relates to a motor stator, and more particularly to a waterproof motor stator structure that effectively protects a stator against external moisture and salt spray but requires only reduced time, labor and material costs.

BACKGROUND OF THE INVENTION

The cooling fan has been widely used to remove heat generated by a variety of electronic devices and components, such as central processing units (CPU), servers, power supplies, communication chassis, and telecommunication base stations. The cooling fan is also often used in very severe environments, such as humid, wet, and salt spray environments. Since a general cooling fan is not provided with any protective structure against water and salt spray, the stator inside the fan is subject to corrosion caused by invading water and salt spray. In some worse conditions, the circuit board of the fan is corroded and damaged to thereby shorten the service life of the fan.

Two solutions have been proposed to overcome the above problems. One of the two solutions is insert molding technique, and the other solution is pour molding technique. In insert molding, first arrange the stator and the circuit board of the fan on a fan frame to form a subassembly and then position the subassembly in a mold before injecting a large quantity of molten plastic material into the mold. When the molten plastic material is cooled and set in the mold, the above said subassembly in the molded plastic material is removed from the mold, that is, the mold is removed.

Therefore, the stator and the circuit board enclosed in the molded plastic material are protected against external water. According to the pour molding technique, the stator and the circuit board are first assembled to the fan frame to form a subassembly, and then, put the subassembly in a mold and pour a large quantity of adhesive material into the mold. After the adhesive material is hardened in the mold, the subassembly enclosed in the molded adhesive material is removed from the mold, that is, the mold is removed. Therefore, the stator and the circuit board enclosed in the adhesive material are protected against external water.

While the conventional insert molding solution and pour molding solution can enclose the stator and the circuit board in the molded plastic material and the molded adhesive material, respectively, to achieve the purpose of protecting the stator and the circuit board against external water, they all require a mold for positioning the stator and the circuit board therein for subsequent insert molding or pour molding process. Further, additional time and labor are needed to remove the mold when the insert molding or pour molding process is completed. Therefore, the conventional insert molding solution and pour molding solution involve complicated manufacturing process to consume more time and labor and result in lowered productivity and increased manufacturing cost. In brief, the conventional solutions for protecting the stator and circuit board against external moisture or salt spray have the following disadvantages: (1) increased material cost; (2) complicated manufacturing process; and (3) consuming more time and labor.

It is therefore tried by the inventor to develop an improved waterproof motor stator structure to overcome the disadvantages in the conventional solutions.

SUMMARY OF THE INVENTION

A primary object of the present invention is to provide a waterproof motor stator structure that effectively protects a stator and a circuit board of a fan against damages caused by external moisture and salt spray but requires only reduced material cost.

Another object of the present invention is to provide a waterproof motor stator structure that can be manufactured with simplified procedures at reduced time and labor costs.

To achieve the above and other objects, the waterproof motor stator structure according to the present invention includes a circuit board; a stator, a lower shell, an upper shell, and a protective layer. The stator is mounted on one face of the circuit board and electrically connected to the circuit board. The lower shell has an open-topped annular recess formed on one side thereof for receiving the circuit board therein, and an opening located at a center of the lower shell and communicable with the annular recess. The upper shell is located on the face of the circuit board having the stator mounted thereon, and is fitted around an outer side of the stator. The upper shell has an open lower end forming a first opening and an opposite partially open upper end providing a second opening; and the first opening is communicable with the second opening of the upper shell and the central opening on the lower shell.

The protective layer is formed in the annular recess to encapsulate the circuit board and the open lower end of the upper shell, and accordingly joins the lower shell and the upper shell into an integral unit. With the above structural design of the present invention, the waterproof motor stator structure can be achieved with reduced time, labor and material costs while effectively protects the stator and the circuit board against damages caused by external moisture and salt spray.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
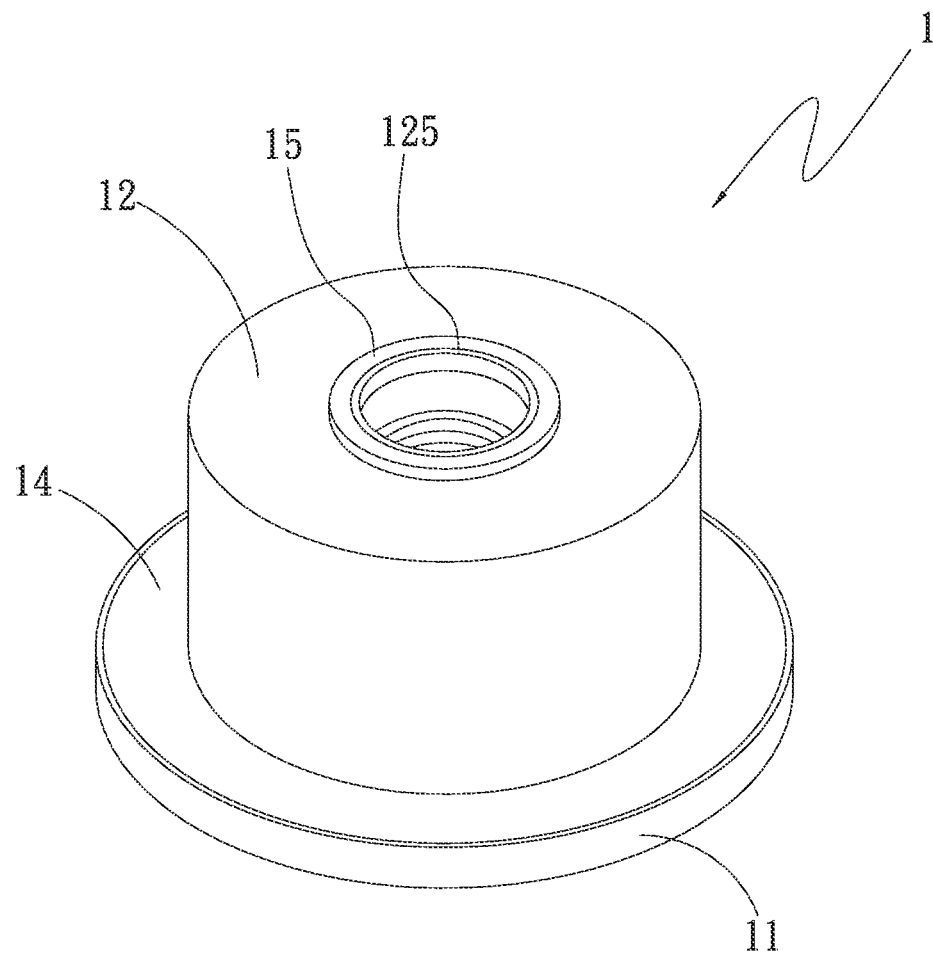
FIG. 1 is an assembled perspective view of a waterproof motor stator structure according to a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
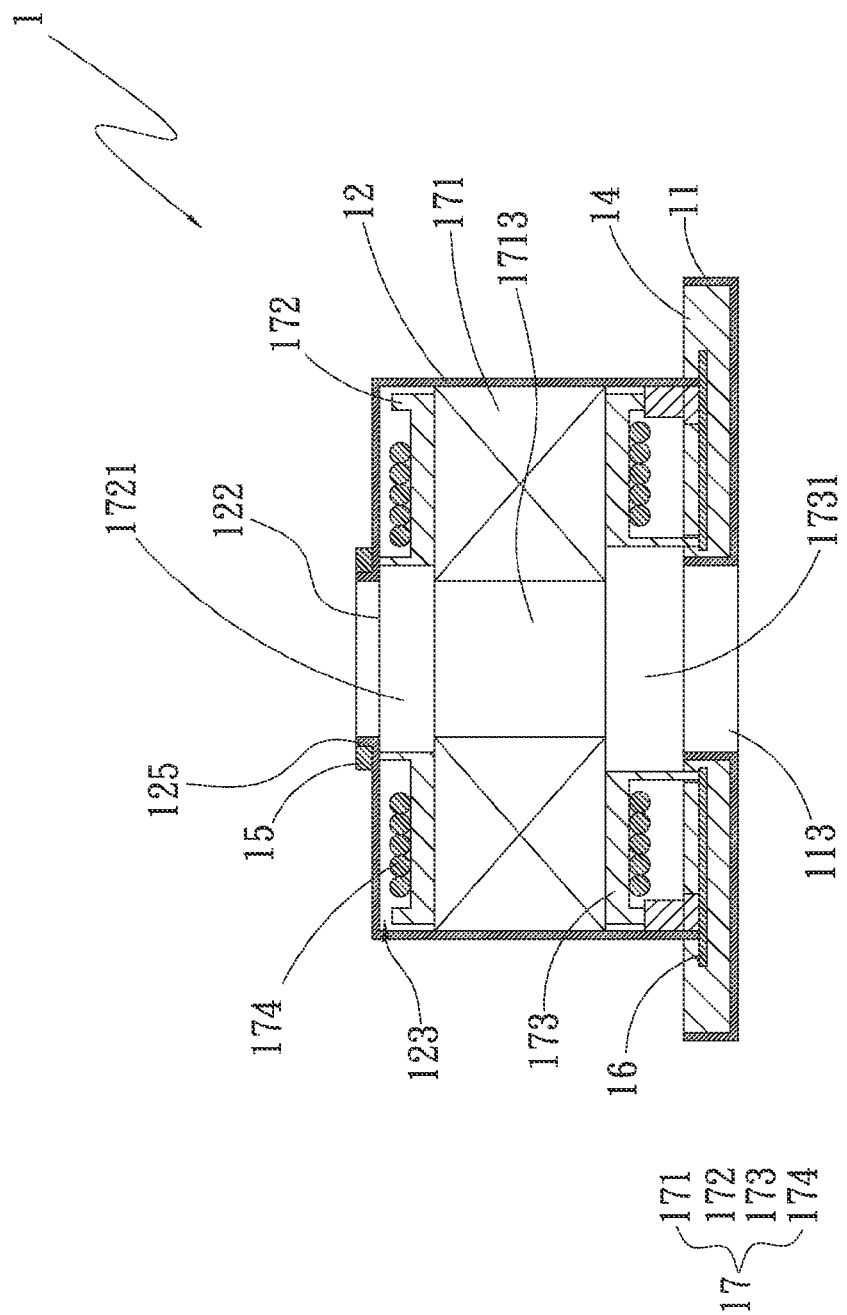
FIG. 2 is a sectional view of FIG. 1.
Figure 3:
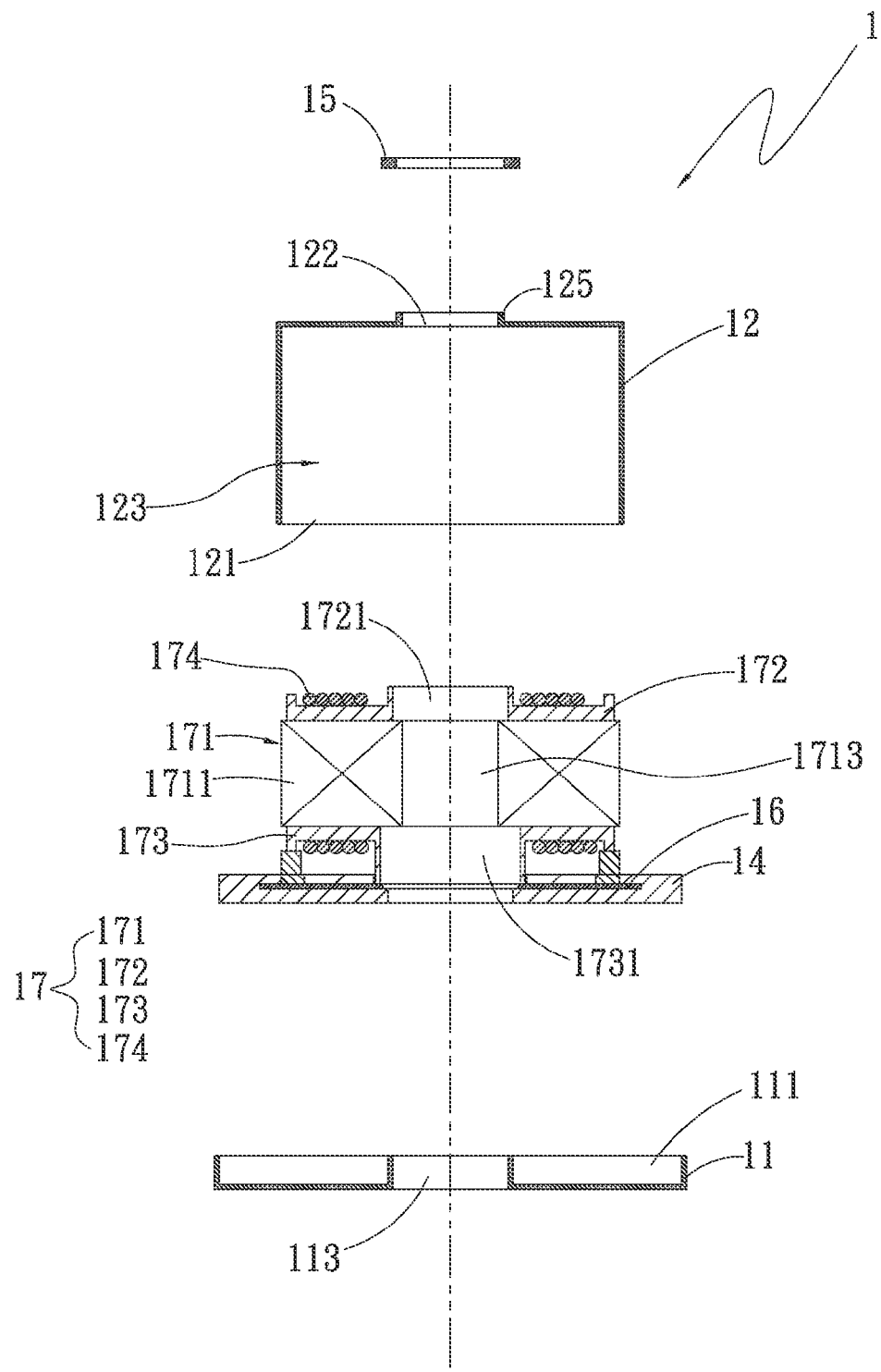
FIG. 3 is an exploded view of FIG. 2.

Please refer to FIG. 1 that is an assembled perspective view of a waterproof motor stator structure 1 according to a first preferred embodiment of the present invention, and to FIGS. 2 and 3, that are assembled and exploded sectional views, respectively, of the waterproof motor stator structure 1 shown in FIG. 1. As shown, the waterproof motor stator structure 1 includes a circuit board 16, a stator 17, a lower shell 11, an upper shell 12, and a protective layer 14. The stator 17 is mounted on one face of the circuit board 16 opposite to the lower case 11 and is electrically connected to the circuit board 16. The stator 17 includes a silicon steel plate assembly 171, an upper insulation frame 172, a lower insulation frame 173, and windings 174. The silicon steel plate assembly 171 is located between the upper and the lower insulation frame 172, 173, and is formed of a plurality of stacked silicon steel plates 1711. The silicon steel plates 1711 are respectively provided at a central area with a through hole 1713, which extends through the silicon steel plate 1711 in a thickness direction thereof.

The upper and the lower insulation frame 172, 173 respectively includes a hollow sleeve portion 1721, 1731 corresponding to and communicating with the through holes 1713 of the silicon steel plates 1711. The windings 174 are wound on the upper and the lower insulation frame 172, 173.

In the illustrated first preferred embodiment, the lower shell 11 is configured as a plastic shell without being particularly limited thereto. In practical implementation of the present invention, the lower shell 11 can be otherwise made of a metal material. The lower shell 11 is so configured that it has an open-topped annular recess 111 formed on one side thereof for receiving the circuit board 16 therein and enclosing an opening 113 therein. The opening 113 is located at a center of the lower shell 11 and is communicable with the annular recess 111.

In the first preferred embodiment illustrated in FIGS. 1 to 3, the upper shell 12 is made of a soft material, such as a plastic material, and is in the form of a hollow cylinder. Of course, the upper shell 12 can be otherwise made of a metal material without being particularly limited thereto. The upper shell 12 is located on the face of the circuit board 16 having the stator 17 mounted thereon and fitted around an outer side of the stator 17. The upper shell 12 has an open lower end forming a first opening 121, a partially open upper end providing a second opening 122, and an annular raised portion 125 extended along an outer edge of the second opening 122.

The first opening 121 communicates with the second opening 122 of the upper shell 12 and the central opening 113 on the lower shell 11. The hollow sleeve portion 1721 of the upper insulation frame 172 and the hollow sleeve portion 1731 of the lower insulation frame 173 are aligned with the second opening 122 of the upper shell 12 and the central opening 113 of the lower shell 11.

The upper shell 12 internally defines a hollow receiving space 123 located between and communicating with the first opening 121 and the second opening 122. The stator 17 is accommodated in the receiving space 123 of the upper shell 12, and is therefore effectively protected against damages caused by external moisture and salt spray. The annular raised portion 125 is raised from the upper end of the upper shell 12 to extend along the outer edge of the second opening 122. A retaining ring 15 is tightly fitted on around an outer side of the annular raised portion 125. The retaining ring 15 can be made of a rigid material, such as a plastic material, or be made of a metal material.

The protective layer 14 can be formed of liquid adhesive, thermoplastic plastics, rubber or thermosetting plastics. The protective layer 14 is formed in the annular recess 111 to encapsulate the circuit board 16 and the lower end of the upper shell 12 that defines the first opening 121. In the illustrated first preferred embodiment, the protective layer 14 is formed in the annular recess 111 by pour molding to encapsulate the circuit board 16 and the lower end of the upper shell 12, so that the lower shell 11 and the upper shell 12 are joined into an integral unit. However, it is understood the protective layer 14 is not necessarily formed by pour molding. In practical implementation of the present invention, the protective layer 14 can be otherwise formed in the annular recess 111 by injection molding to encapsulate the circuit board 16 and the lower end of the upper shell 12, so as to combine join the lower shell 11 and the upper shell 12 into an integral unit.

Therefore, by arranging the circuit board 16 and the stator 17 in the lower shell 11 and the upper shell 12, respectively, and forming the protective layer 14 in the lower shell 11 to encapsulate the circuit board 16 and the lower end of the upper shell 12 in order to join the lower shell 11 and the upper shell 12 into one integral body, it is able to effectively protect the stator 17 and the circuit board 16 against damages caused by external moisture and salt spray.

In addition, according to the present invention, no matter whether the protective layer 14 is formed by way of pour molding or injection molding, the material for forming it is directly poured or injected into the annular recess 111 of the lower shell 11 to encapsulate the circuit board 16 and the lower end of the upper shell 12. Thus, unlike the conventional solutions for protecting the circuit board and the stator against moisture and salt spray, the forming of the waterproof motor stator structure according to the present invention does not require any mold to enable the step of pour molding or injection molding, and accordingly, can save the mold-removing step. Further, according to the present invention, the volume of material required for forming the protective layer 14 is only the same as that of the annular recess 111, which is largely reduced compared to the conventional solutions. In brief, with the present invention, a waterproof motor stator structure can be achieved at effectively reduced time, labor and material costs with simplified manufacturing procedures.

Figure 4:
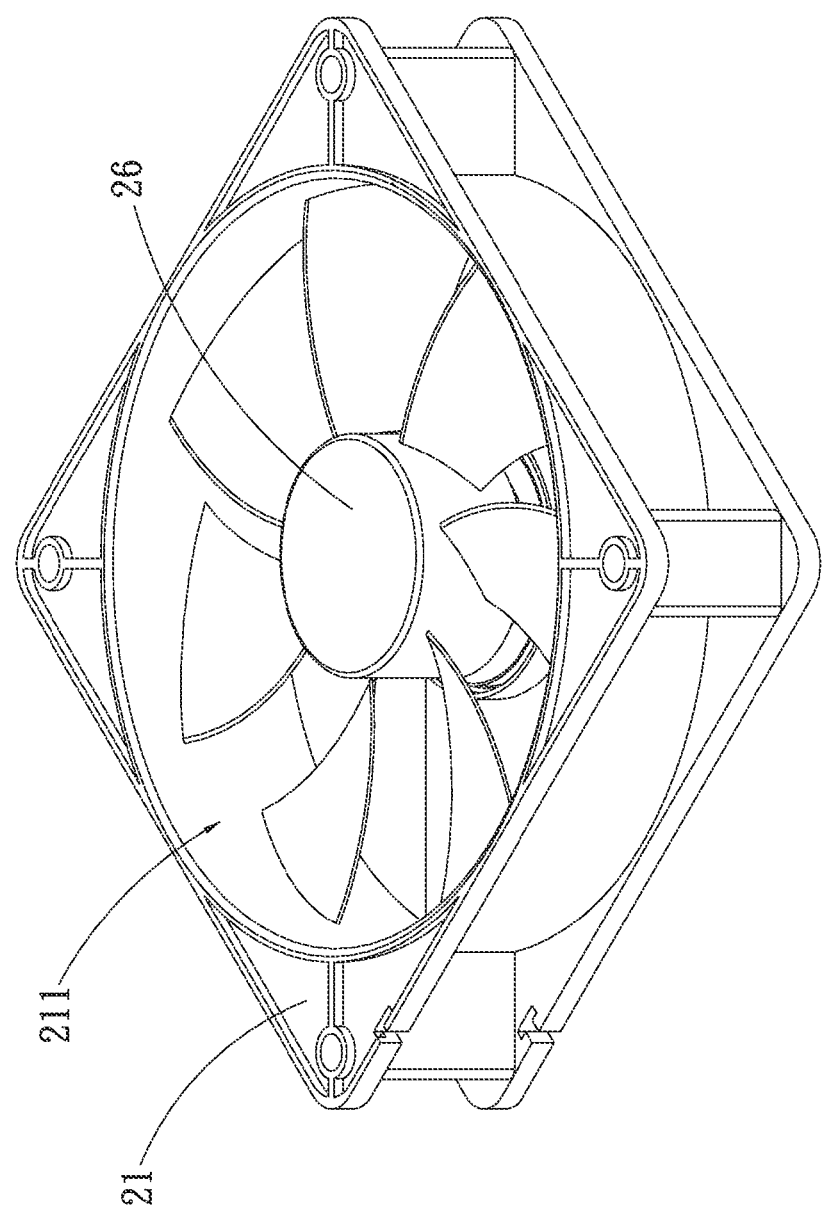
FIG. 4 is an assembled perspective view of a fan according to a second preferred embodiment of the present invention, which includes the waterproof motor stator structure shown in FIGS. 1 to 3.
Figure 5:
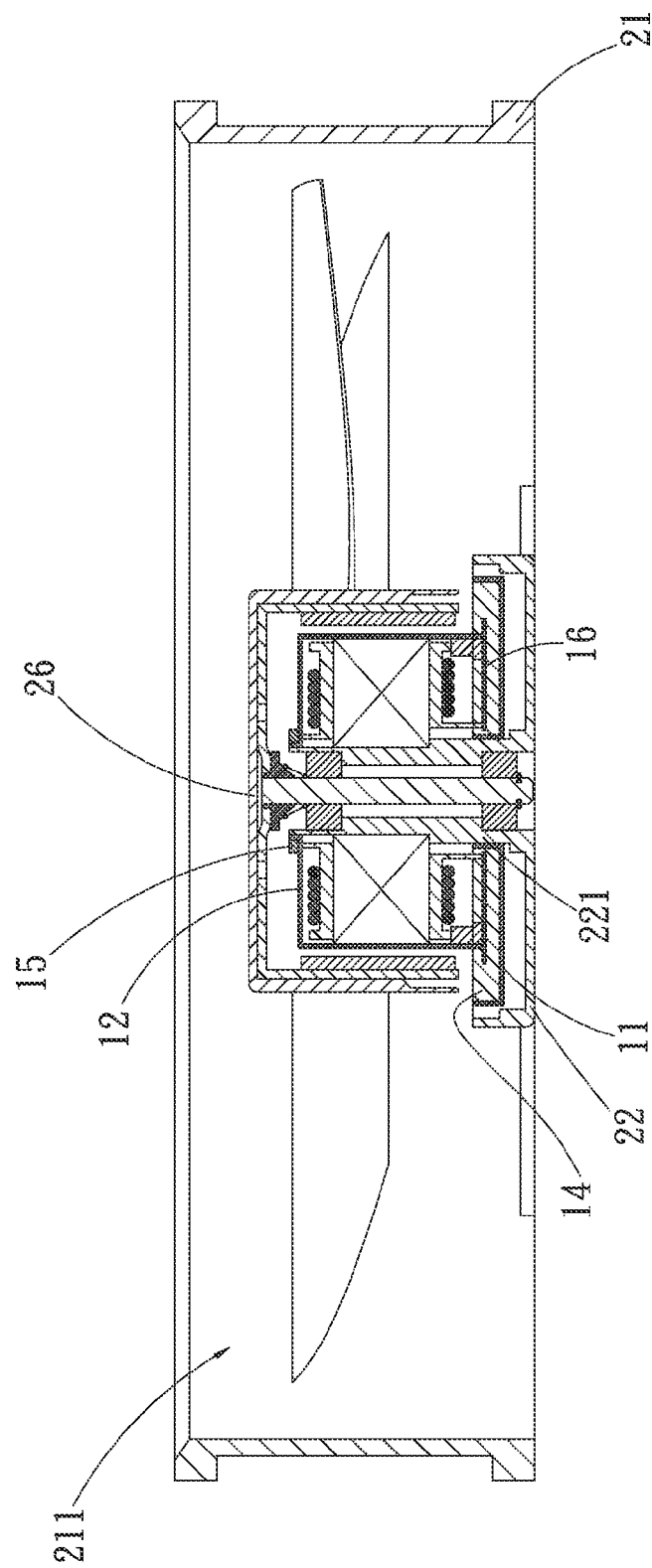
FIG. 5 is a sectional view of FIG. 4.
Figure 6:
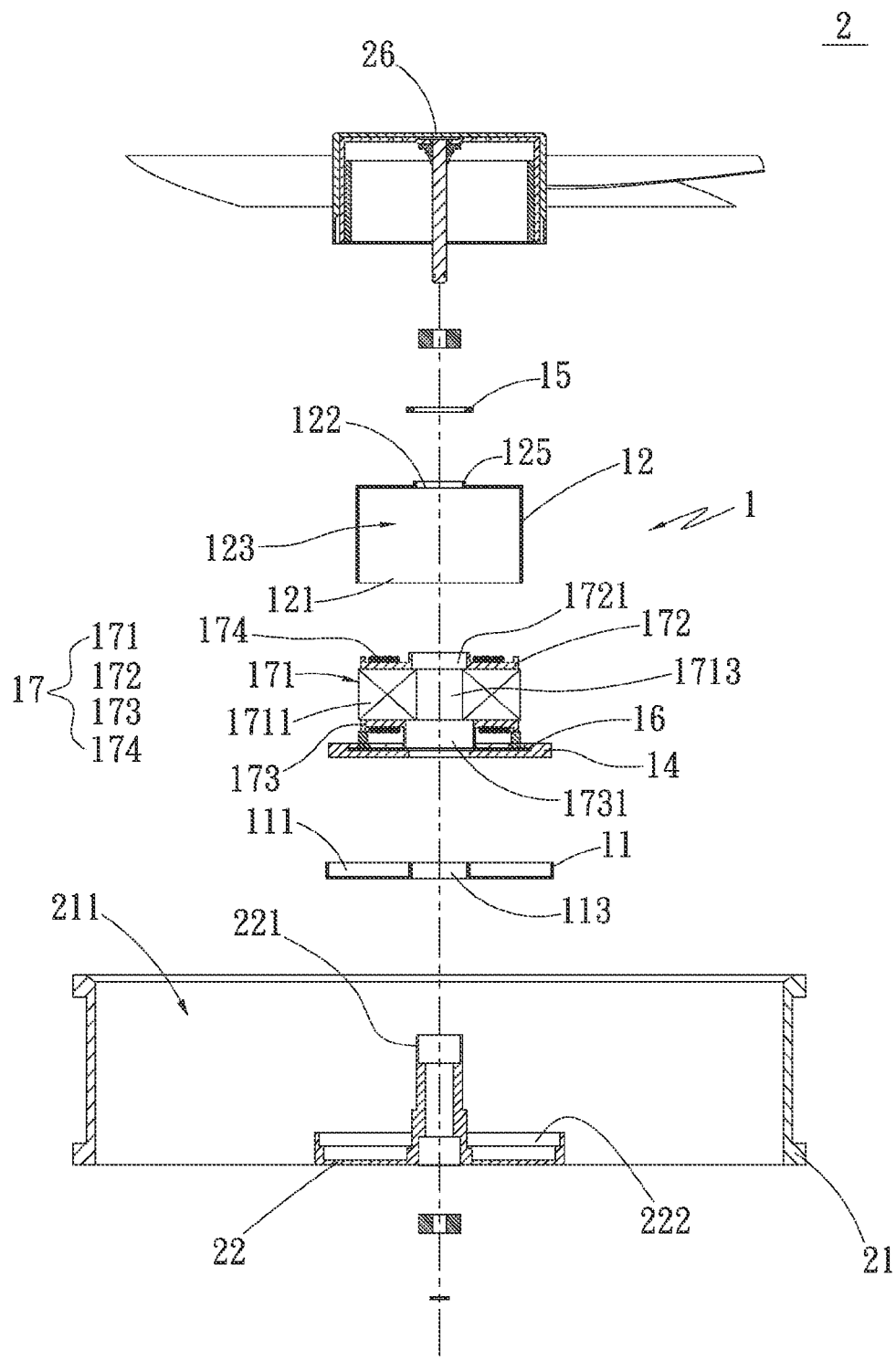
FIG. 6 an exploded view of FIG. 5.

FIG. 4 is an assembled perspective view of a fan 2 according to a second preferred embodiment of the present invention, which includes the waterproof motor stator structure 1 shown in FIGS. 1 to 3; FIGS. 5 and 6 are assembled and exploded sectional views, respectively, of the fan 2 shown in FIG. 4. As shown, the fan 2 includes, in addition to the waterproof motor stator structure 1, a fan frame 21 and a rotor 26. Since the waterproof motor stator structure 1 has been described in details above, it is not repeatedly described below.

The fan frame 21 defines an inner space 211 and has a support base 22 located at a central portion of the inner space 211. The support base 22 defines a confining recess 222 on an upper side thereof for receiving the lower shell 11 therein, and includes a bearing cup 221 forward projected from a central area of the confining recess 222 to sequentially extend through the central opening 113 on the lower shell 11, the hollow sleeve portion 1731 of the lower insulation frame 173, the through holes 1713 on the silicon steel plates 1711 and the hollow sleeve portion 1721 of the upper insulation frame 172 into the second opening 122 on the upper shell 12. In other words, the waterproof motor stator structure 1 is fitted on around the bearing cup 221 while the rotor 26 is rotatably connected to the bearing cup 221 and covers the upper shell 12 as well as the stator 17 therein.

Figure 7:
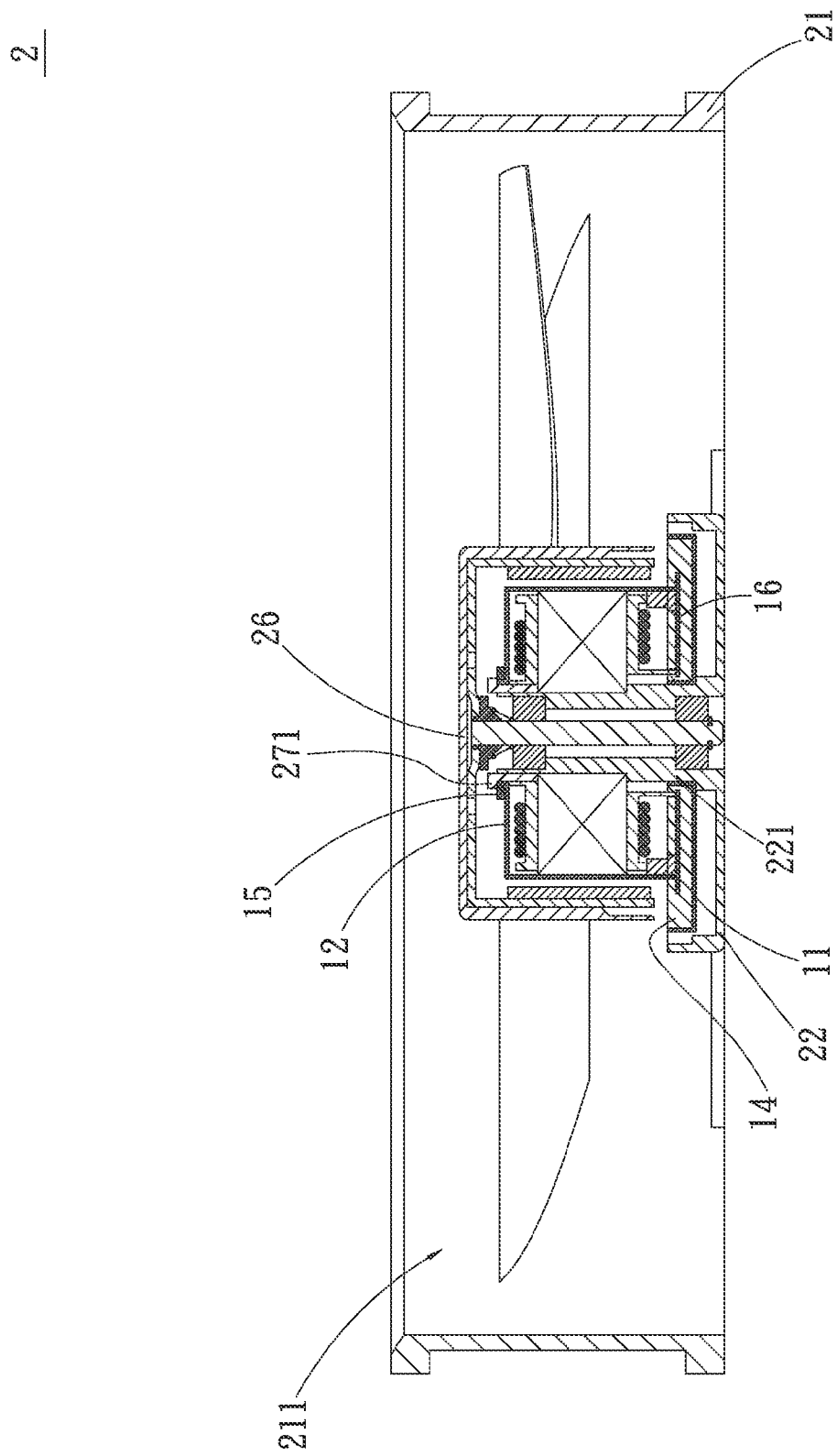
FIG. 7 is an assembled sectional view of a variant of the fan according to the second preferred embodiment of the present invention.
Figure 8:
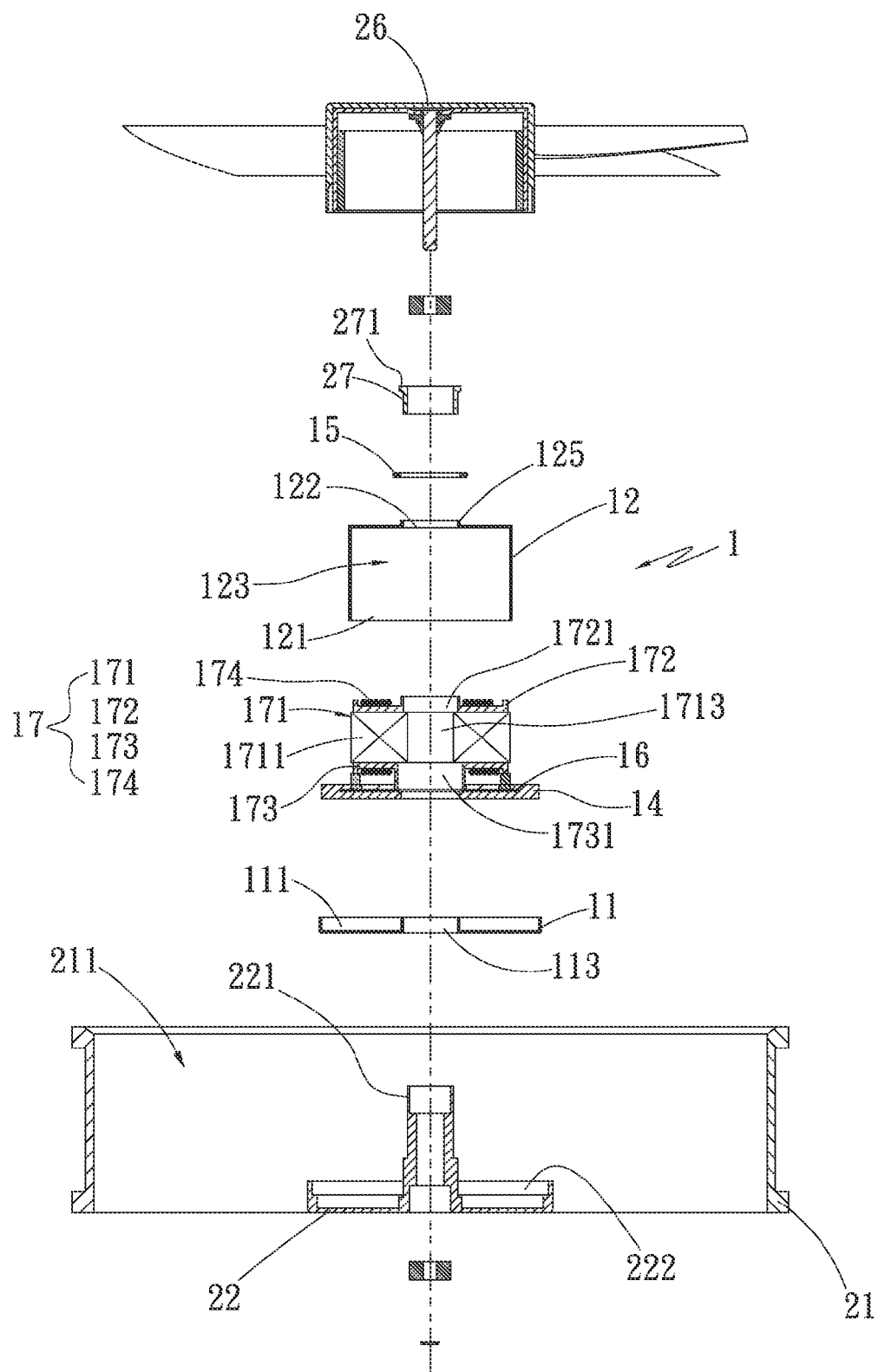
FIG. 8 is an exploded view of FIG. 7.

Further, by fitting the retaining ring 15 on around the outer side of the annular raised portion 125, the annular raised portion 125 is radially inward pushed by the retaining ring 15 to move toward a center of the second opening 122. In this manner, the annular raised portion 125 can be brought to tightly press an inner wall surface thereof against the bearing cup 221, so as to exactly seal the stator 17 and the circuit board 16 in between the lower shell 11 and the upper shell 12 and effectively achieve the purpose of protecting the stator 17 and the circuit board 16 against external water and salt spray. FIG. 7 is an assembled sectional view of a variant of the fan 2 according to the second preferred embodiment of the present invention; and FIG. 8 is an exploded view of FIG. 7. As can be seen in FIGS. 7 and 8, the variant of the fan 2 further includes a round sealing member 27 fitted between an outer edge of the second opening 122 and the bearing cup 221 to seal a clearance existed therebetween. The round sealing member 27 also seals a clearance between the bearing cup 221 and the inner wall surface of the annular raised portion 125. The round sealing member 27 includes a holding-down flange 271 formed around a front outer end thereof for downward pressing against tops of the annular raised portion 125 and the retaining ring 15, bringing the retaining ring 15 and the annular raised portion 125 to tightly bear on the round sealing member 27 to effectively stop external moisture and salt spray from entering into the upper shell 12 via the round sealing member 27. In this manner, an even better effect of sealing the stator 17 and the circuit board 16 in between the lower shell 11 and the upper shell 12 can be achieved. Further, according to the present invention, the round sealing member 27 can be made of a soft material, such as rubber or plastics, or be made of a rigid metal material; and the retaining ring 15 is made of a soft material, such as a plastic material.

With the above arrangements, the present invention is superior to the prior art due to the following advantages: (1) reduced time, labor and material costs; (2) simplified manufacturing procedures; and (3) improved water and salt spray retarding effect.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A waterproof motor stator structure, comprising:
   a circuit board;
   a stator being mounted on one face of the circuit board and electrically connected to the circuit board;
   a lower shell having an open-topped annular recess formed on one side thereof for receiving the circuit board therein, and an opening located at a center of the lower shell and communicable with the annular recess;
   an upper shell being located on the face of the circuit board having the stator mounted thereon and fitted around an outer side of the stator; the upper shell having an open lower end defining a first opening and a partially open upper end providing a second opening; and the first opening being communicable with the second opening of the upper shell and the central opening on the lower shell wherein the upper shell further has an annular raised portion extended along an outer edge of the second opening; and a retaining ring being fitted on around an outer side of the annular raised portion, wherein the stator includes a silicon steel plate assembly, an upper insulation frame, a lower insulation frame, and windings; the silicon steel plate assembly being located between the upper and the lower insulation frame; the upper and the lower insulation frame respectively including a hollow sleeve portion corresponding to and communicating with the second opening on the upper shell and the central opening on the lower shell; and the windings being wound on the upper and the lower insulation frame, wherein the waterproof motor stator structure is fitted on around a support base of a fan; the support base defining a confining recess on an upper side thereof for receiving the lower shell therein, and including a bearing cup forward projected from a central area of the confining recess to sequentially extend through the central opening on the lower shell, the hollow sleeve portion of the lower insulation frame, the hollow sleeve portion of the upper insulation frame into the second opening on the upper shell; and
   a protective layer being formed in the annular recess to encapsulate the circuit board and the open lower end of the upper shell, and accordingly joining the lower shell and the upper shell into an integral unit.

2. The waterproof motor stator structure as claimed in claim 1, wherein the upper shell internally defines a hollow receiving space located between and communicating with the first opening and the second opening, and the stator being accommodated in the hollow receiving space.

3. The waterproof motor stator structure as claimed in claim 1, further comprising a round sealing member fitted in a clearance existed between the second opening on the upper shell and the bearing cup to seal the clearance; and the round sealing member including a holding-down flange formed around a front outer end thereof for pressing against tops of the annular raised portion and the retaining ring.

4. The waterproof motor stator structure as claimed in claim 1, wherein the protective layer is formed in the annular recess by means of pour molding or injection molding to encapsulate the circuit board and the open lower end of the upper shell.

* * * * *